(12) United States Patent
Bovitz

(10) Patent No.: US 7,859,874 B2
(45) Date of Patent: Dec. 28, 2010

(54) UNIVERSAL AC OR DC AIRCRAFT DEVICE POWER SUPPLY HAVING POWER FACTOR CORRECTION

(75) Inventor: David J. Bovitz, Minneapolis, MN (US)

(73) Assignee: Rosemount Areospace Inc., Burnsville, MN (US)

( * ) Notice: Subject to any disclaimer, the term of this patent is extended or adjusted under 35 U.S.C. 154(b) by 516 days.

(21) Appl. No.: 11/742,941

(22) Filed: May 1, 2007

(65) Prior Publication Data

US 2007/0253135 A1 Nov. 1, 2007

Related U.S. Application Data

(60) Provisional application No. 60/796,497, filed on May 1, 2006.

(51) Int. Cl.
*H02M 3/24* (2006.01)
*H02M 3/28* (2006.01)
*H02M 3/315* (2006.01)

(52) U.S. Cl. .................. 363/142; 363/101; 363/89; 307/75

(58) Field of Classification Search ............ 363/89, 363/95, 101, 124–127, 142–143; 323/207, 323/266; 307/72, 73, 75
See application file for complete search history.

(56) References Cited

U.S. PATENT DOCUMENTS

| | | | |
|---|---|---|---|
| 4,100,596 | A | 7/1978 | Olafson et al. |
| 4,103,325 | A | 7/1978 | Hyman et al. |
| 4,551,632 | A | 11/1985 | Jourdan et al. |
| 4,678,144 | A | 7/1987 | Goehner et al. |
| 5,499,187 | A | 3/1996 | Smith |
| 5,864,221 | A | 1/1999 | Downs et al. |
| 5,969,962 | A | 10/1999 | Gabor |
| 5,982,642 | A | 11/1999 | Herfurth |
| 6,272,025 | B1 | 8/2001 | Riggio et al. |
| 6,459,175 | B1 | 10/2002 | Potega |
| 6,504,132 | B1 | 1/2003 | Church |
| 6,654,267 | B2 | 11/2003 | Leynaert |

(Continued)

OTHER PUBLICATIONS

International Search Report mailed Apr. 23, 2008 in PCT/US07/067899.

(Continued)

*Primary Examiner*—Gary L Laxton
*Assistant Examiner*—Nusrat J Quddus
(74) *Attorney, Agent, or Firm*—Womble Carlyle

(57) ABSTRACT

An aircraft device power supply is capable of connecting to either an AC or a DC power bus provided on an aircraft. When connected to an aircraft's AC power bus, an AC power signal is EMI-filtered, stepped down in voltage to the same voltage as that of the DC power bus, and then rectified. When connected to an aircraft's DC power bus, a DC power signal is EMI-filtered before it is merged with the rectified AC power signal via an AC/DC switchover subcircuit. The output of the AC/DC switchover subcircuit is input to a power factor correction subcircuit which outputs a boosted DC voltage, regardless of which of the AC or DC aircraft power buses is connected to the power supply. A step down converter reduces the boosted DC voltage to a lower, system voltage which may then be further reduced or modified, as appropriate for device to be powered.

25 Claims, 8 Drawing Sheets

U.S. PATENT DOCUMENTS

| | | |
|---|---|---|
| 6,704,625 B2 | 3/2004 | Albero et al. |
| 6,784,624 B2 * | 8/2004 | Buonocunto ................ 315/247 |
| 6,807,073 B1 | 10/2004 | Scarlatescu |
| 7,039,821 B1 | 5/2006 | Potega |
| 7,059,769 B1 | 6/2006 | Potega |
| 7,112,944 B1 | 9/2006 | Kojori |
| 7,137,599 B1 | 11/2006 | Sitzmann et al. |
| 7,148,659 B2 * | 12/2006 | Lanni ........................ 363/142 |

OTHER PUBLICATIONS

Written Opinion mailed Apr. 23, 2008 in PCT/US07/067899.

* cited by examiner

US 7,859,874 B2

UNIVERSAL AC OR DC AIRCRAFT DEVICE POWER SUPPLY HAVING POWER FACTOR CORRECTION

RELATED APPLICATIONS

The present application claims priority to U.S. Provisional application No. 60/796,497, filed May 1, 2006, whose contents are incorporated by reference in their entirety.

FIELD OF THE INVENTION

One embodiment of the present invention is directed to a power supply for aircraft-mounted devices. In particular, one embodiment is directed to a power supply that is configured to be connected to either 115 V AC or 28 VDC aircraft power bus, and outputs one or more predetermined DC voltages.

BACKGROUND INFORMATION

Many aircraft-mounted devices use either a 115VAC power bus or a 28VDC power bus, but not both. These devices include computers, display panels, communications equipment, control panels, sensors and the like. As is known to those skilled in the art, each such device includes a power supply that connects to one of the two aircraft power buses. The power supply in each such device then provides that device with one or more system voltages to power components such as fans, integrated circuit chips, indicators, transmitters, etc. within that device.

U.S. Pat. No. 4,100,596 and U.S. Pat. No. 4,103,325 disclose an aircraft power supply which takes in a single-phase AC voltage and a DC voltage, and outputs a three-phase AC voltage.

U.S. Pat. No. 5,499,187 discloses an aircraft power supply which senses whether the voltage is an aircraft AC voltage or an aircraft DC voltage and outputs a DC voltage.

U.S. Pat. No. 6,654,267 discloses an aircraft power supply which takes the regularly available 400 Hz 115 VAC power and converts into a DC voltage for use by passengers, e.g., 12 or 24 VDC. The power supply also converts 400 Hz AC to 60 Hz AC, and shapes the waveform.

U.S. Pat. No. 7,112,944 discloses an aircraft power supply having both AC and DC power source inputs to supply a variety of output voltages.

However, none of the above power supplies employ circuitry to correct the power factor and reduce harmonic distortion of a rectified AC current.

SUMMARY OF THE INVENTION

In one aspect the present invention is directed to an aircraft power supply that can be connected to either an aircraft AC power source or an aircraft DC power source, to produce a DC system voltage for powering aircraft-mounted devices.

In one embodiment, such an aircraft power supply includes:

a first subcircuit having an input and an output, the first subcircuit configured to accept an AC power signal, convert the AC power signal to a lower voltage, and output a rectified AC power signal, when the power supply is connected to an aircraft AC power bus;

an AC/DC switchover subcircuit having a first input connected to the output of the first subcircuit and a second input, and further having a switchover output, the AC/DC switchover subcircuit configured to: output the rectified AC power signal, when the power supply is connected to the aircraft AC power bus and not to an aircraft DC power bus; and output a DC signal, when the power supply is connected to the aircraft DC power bus and not to the aircraft AC power bus;

a power factor correction subcircuit having an input connected to the switchover output, and further having an output, the power factor correction subcircuit configured to correct a power factor of a rectified AC power signal, when the power supply is connected to the aircraft AC power bus, and further configured to output a DC power signal having a first voltage; and a DC-DC step-down converter having an input connected to the output of the power factor correction subcircuit, and further having a system voltage output, the DC-DC step-down converter configured to reduce the first voltage to a second voltage lower than said first voltage.

The power supply may include an AC electromagnetic interference (EMI) filter configured to output a filtered AC power signal to the input of the first subcircuit, when the power supply is connected to the aircraft AC power bus; and a DC EMI filter configured to output a filtered DC power signal to the second input of the AC/DC switchover subcircuit, when the power supply is connected to the aircraft DC power bus. The AC EMI filter may be configured to filter a 115V, 400 Hz power signal from the aircraft's AC power bus; and the DC EMI filter may configured to filter a 28 VDC power signal from the aircraft's DC power bus. The AC EMI filter and DC EMI filter may be provided on a common integrated circuit board.

In another aspect, the invention is directed to an aircraft-mountable device adapted to be connected to either an aircraft alternating current (AC) power bus or to an aircraft direct current (DC) power bus, the aircraft-mountable device having the aforementioned power supply. The aircraft-mountable device may be a computer, a display panel, communications equipment, a control panel, or a sensor.

DETAILED DESCRIPTION

The contents of aforementioned U.S. Pat. Nos. 4,100,596, 4,103,325, 5,49,187, 6,654,267 and 7,112,944 are incorporated by reference to the extent necessary to under the present invention.

Figure 1:
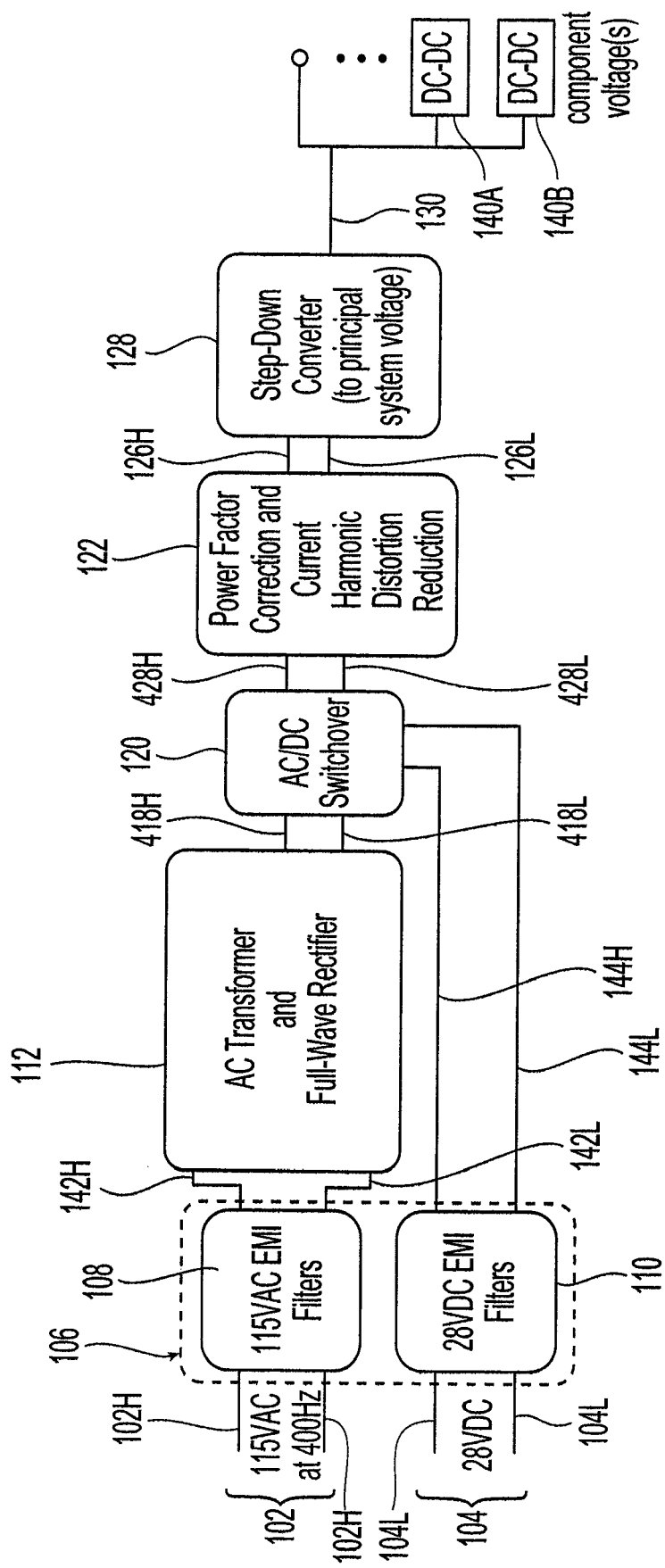
FIG. 1 is a block diagram of a power supply in accordance with one embodiment of the invention.

FIG. 1 shows top-level block diagram of one embodiment of a power supply circuit 100 in accordance with the present invention. The circuit 100 can be connected to either an aircraft's 115 VAC, 400 Hz power bus 102 or to the aircraft's 28 VDC power bus 104. This allows the equipment being powered via this circuit 100 to be used without regard to which power supply is nearby. In normal use, the circuit 100 is connected only to one of the two power buses 102, 104, at any given time.

Also in the typical case, the circuit 100 serves as the power supply for a device, the device itself for use in an aircraft and thus capable of being powered off of either the aircraft's AC power bus 102 or the aircraft's DC power bus 104. Thus devices such as computers, display panels, communications equipment, control panels, sensors or any one of a host of other powered devices may incorporate such a power supply circuit 100.

In one embodiment, the incoming power from the aircraft power buses is first subjected to (electromagnetic interference) EMI filtering. On the AC side, the aircraft's AC current comes in through a first pair of conductors 102H, 102L and enters a 115VAC, 400 Hz EMI filter 108 which is designed to filter power signals above 400 Hz. The output of the 115VAC 400 Hz EMI filter 108 is a filtered AC power signal across lines 142H, 142L. On the DC side, the aircraft's DC current comes in through a second pair of conductors 104H, 104L and enters a 28 VDC EMI filter 110 which is designed to filter power signals above the DC frequency. The output of the 28 VDC EMI filter 110 is a filtered DC power signal across lines 144H, 144L.

It can therefore be seen from the foregoing that the AC EMI filter 108 is configured to filter a 115V, 400 Hz power signal from the aircraft's AC power bus 102, while the DC EMI filter 110 is configured to filter a 28 VDC power signal from the aircraft's DC power bus 104. Though filtering the incoming power signals is highly advisable, it is not an absolute necessity. Furthermore, while the AC EMI filter 108 and DC EMI filter 110 are shown as separate filters, they may be located proximate one another in a common package 106 or on a common circuit board. It is understood that each pair of conductors 102H, 102L and 104H, 104L are at least partially incorporated into connectors which mate with complementary connectors attached to the power buses 102, 104.

While EMI filters 108, 110 are used in the embodiment shown in FIG. 1, it understood that these are not critical to the invention, especially in those instances where the aircraft power supplies already incorporate such EMI filters for the 115 VAC and 28 VDC power lines.

The output of the AC EMI filter 108 on lines 142H, 142L is connected to the input of an AC power signal shaping subcircuit 112. The AC power signal shaping circuitry includes a 4:1 turns ratio AC transformer 114 followed by a full-wave rectifier 116 (see FIG. 2). When the circuit 100 is connected to the aircraft's 115VAC power bus 102, the AC transformer 114 brings the 115 VAC voltage down to 28 VAC and the full-wave rectifier 116 rectifies the signal in a manner well known to those skilled in art. Given a 115 VAC, 400 Hz AC signal at its input, the output of the AC power signal shaping subcircuit 112 on lines 418H, 418L is a rectified AC signal having a voltage of 28V (comparable to the 28 VDC supplied by the aircraft DC power bus 104. Thus, the AC power signal shaping subcircuit is configured to convert the filtered AC power signal to a lower voltage which is approximately equal in magnitude to a voltage supplied by the aircraft's DC power bus.

The output of the AC power signal shaping subcircuit 112 is connected to an AC/DC switchover circuit 120, as is the output of the 28 VDC EMI filter. Thus, when the circuit 100 is connected to the aircraft's 115 VAC power bus 102, the rectified AC signal on lines 418H, 418L is input to the AC/DC switchover circuit 120. Similarly, when the circuit 100 is connected to the aircraft's 28 VDC power bus 104, the filtered DC signal on lines 144H, 144L is input to the AC/DC switchover circuit 120. The AC/DC switchover circuit 120 permits whichever of the rectified AC signal (on lines 418H, 418L) and the filtered DC signal (on lines 144H, 144L) is present, to pass on to the remainder of circuit 100 via AC/DC switchover output lines 428H, 428L.

Figure 2:
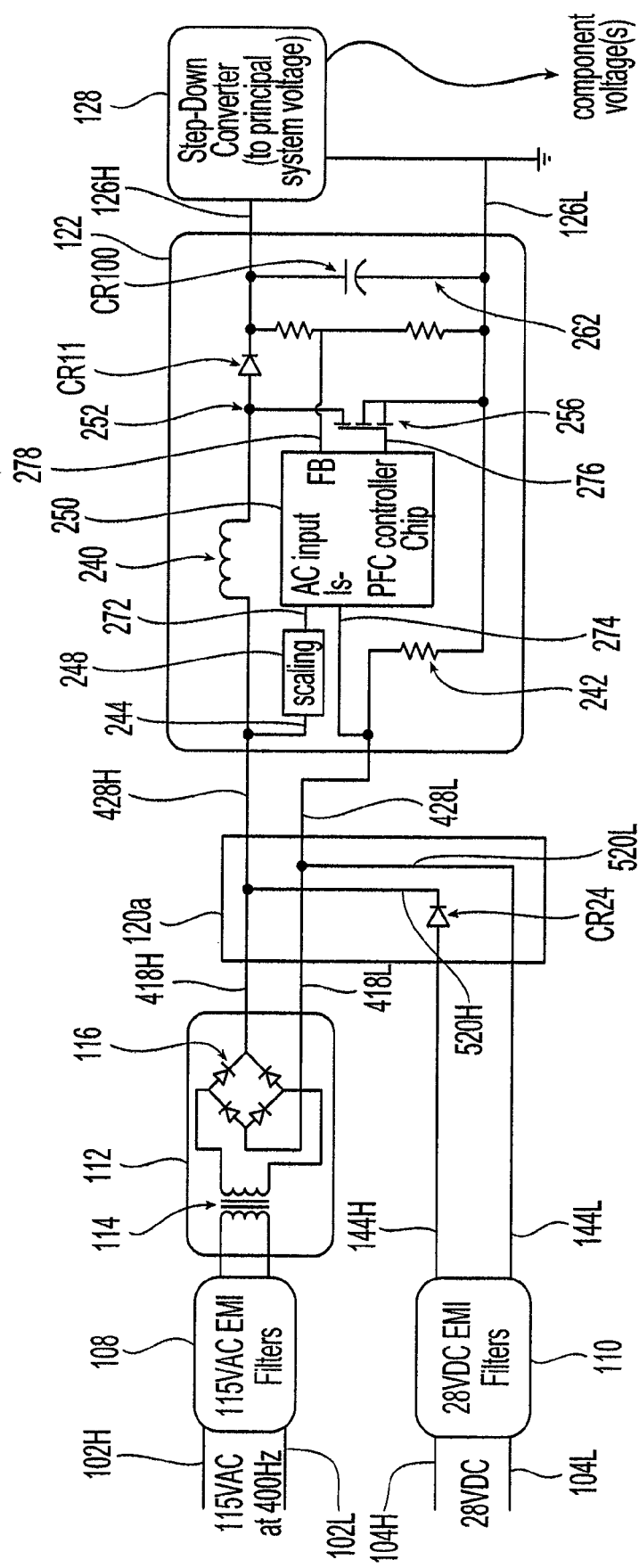
FIG. 2 shows a more detailed view of the embodiment of FIG. 1 with a first implementation of a switchover subcircuit and a power factor corrector.

As seen in FIG. 2, in a first embodiment, the AC/DC switchover circuit 120a comprises a diode CR24. This diode CR24 provides an "OR" connection between the 115 VAC supply and the 28VDC supply. It also prevents current flow from the rectified AC signal on lines 418H, 418L into the 28 VDC EMI filter 100. In the other direction, once the filtered DC signal on high DC line 144H passes through the diode CR24 onto line 520H, it connects with high rectified AC signal line 418H, the two together thus connecting to high AC/DC switchover output line 428H. Meanwhile low DC line 144L, relabeled line 520L within the AC/DC crossover circuit 120a, connects with low rectified AC signal line 418L, the two together thus connecting to low AC/DC switchover output line 428L.

Figure 3:
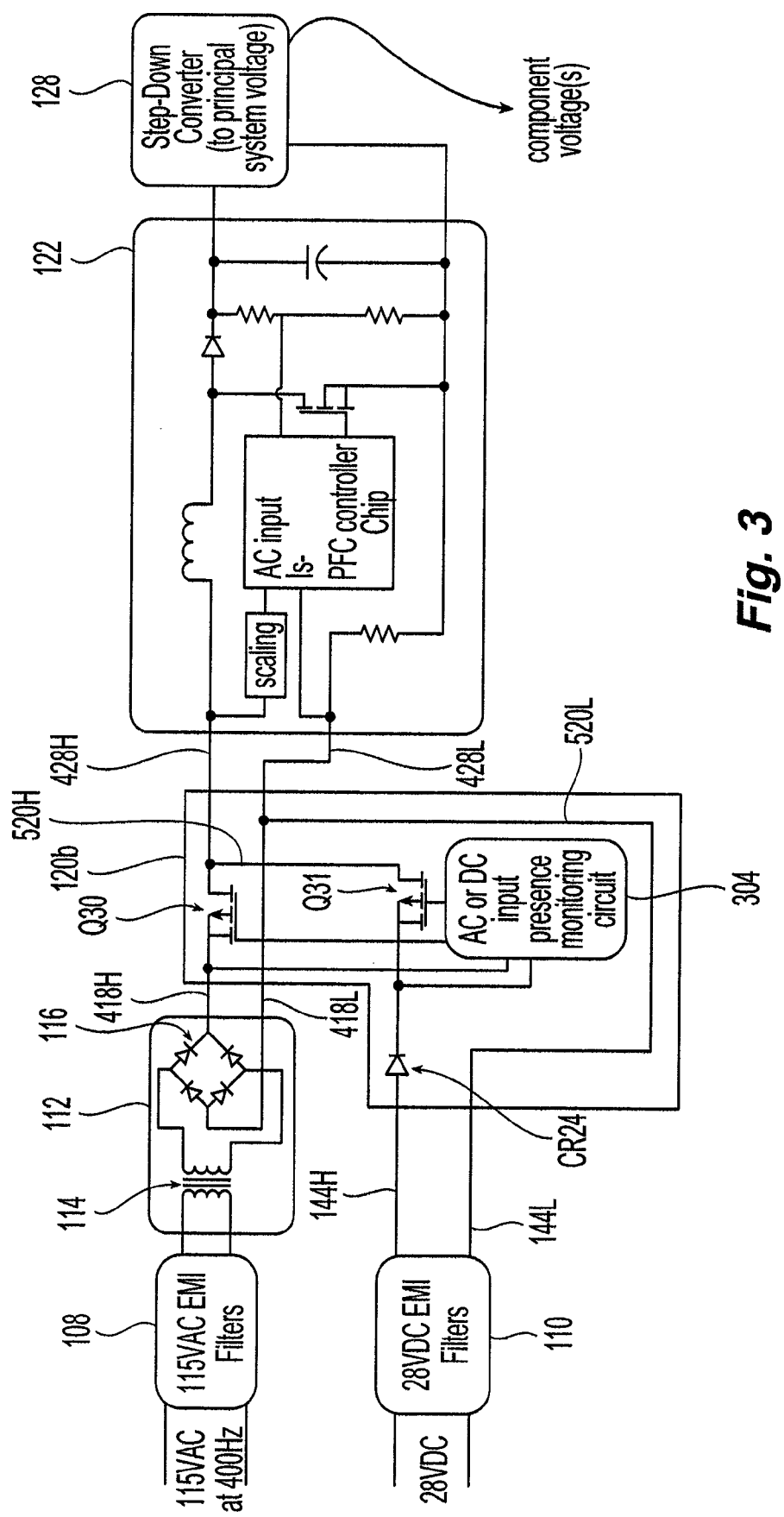
FIG. 3 shows a more detailed view of the embodiment of FIG. 1 with a second implementation of a switchover subcircuit and a power factor corrector.

As seen in FIG. 3, in a second embodiment, the AC/DC switchover circuit 120b includes FET transistor switches Q30, Q31 and an AC/DC sensor circuit 304 in addition to a diode CR24. This arrangement may provided enhanced isolation and reduced noise for the rectified AC signal on lines 418H, 418L or the filtered DC signal on lines 144H, 144L, whichever is present. The AC/DC sensor circuit 304 receives a first input from the high rectified AC signal line 418H to detect whether an AC signal is present and a second input from the high filtered DC signal line 144H (after it has passed through diode CR24) to detect whether a DC signal is present. Depending on the outcome of this detection, the AC/DC sensor circuit 304 turns on transistor Q30 or Q31 to allow the appropriate signal to pass onto high AC/DC switchover output line 428H. Thus, AC/DC sensor circuit 304 is able to isolate the filter and other circuitry of the aircraft power supply that is being used, from the aircraft power supply that is not being used. However, in one mode in which both types of aircraft power supply are present and connected, the switching transistors of the AC/DC sensor circuit 304 may be configured to prioritize which aircraft power supply to use. For instance, the AC/DC switchover subcircuit 120b may be configured to output the rectified AC power signal, when the power supply is connected to both the aircraft AC power bus 102 and to the aircraft DC bus 104.

As is the case with AC/DC switchover circuit 120a (FIG. 2), low DC line 144L, relabeled line 520L within the AC/DC crossover circuit 120b, connects with low rectified AC signal line 418L, the two together thus connecting to low AC/DC switchover output line 428L.

At the AC/DC switchover circuit, the voltage of the rectified AC power signal is approximately the same as a voltage of the filtered DC power signal so that the PFC subcircuit 122 receives approximately the same voltage, whether the power supply is connected to the aircraft's AC power bus or to the aircraft's DC power bus. The AC/DC switchover output lines 428H, 428L are connected to a power factor correction subcircuit 122 ("PFC subcircuit"). As is known to those skilled in the art, ideally, the power factor for converting a rectified power signal AC to DC should be 1.0. As its name indicates, power factor correction subcircuit 122 helps bring the power factor of the rectified AC signal to close to unity. It also helps reduce current harmonic distortion resulting from nonlinearities arising during the conversion. The PFC subcircuit 122 utilizes a standard DC-DC boost-converter topology to control the current drawn with respect to the aircraft power buses 102, 104, thus providing for power factor correction and current harmonic reduction.

Figure 6:
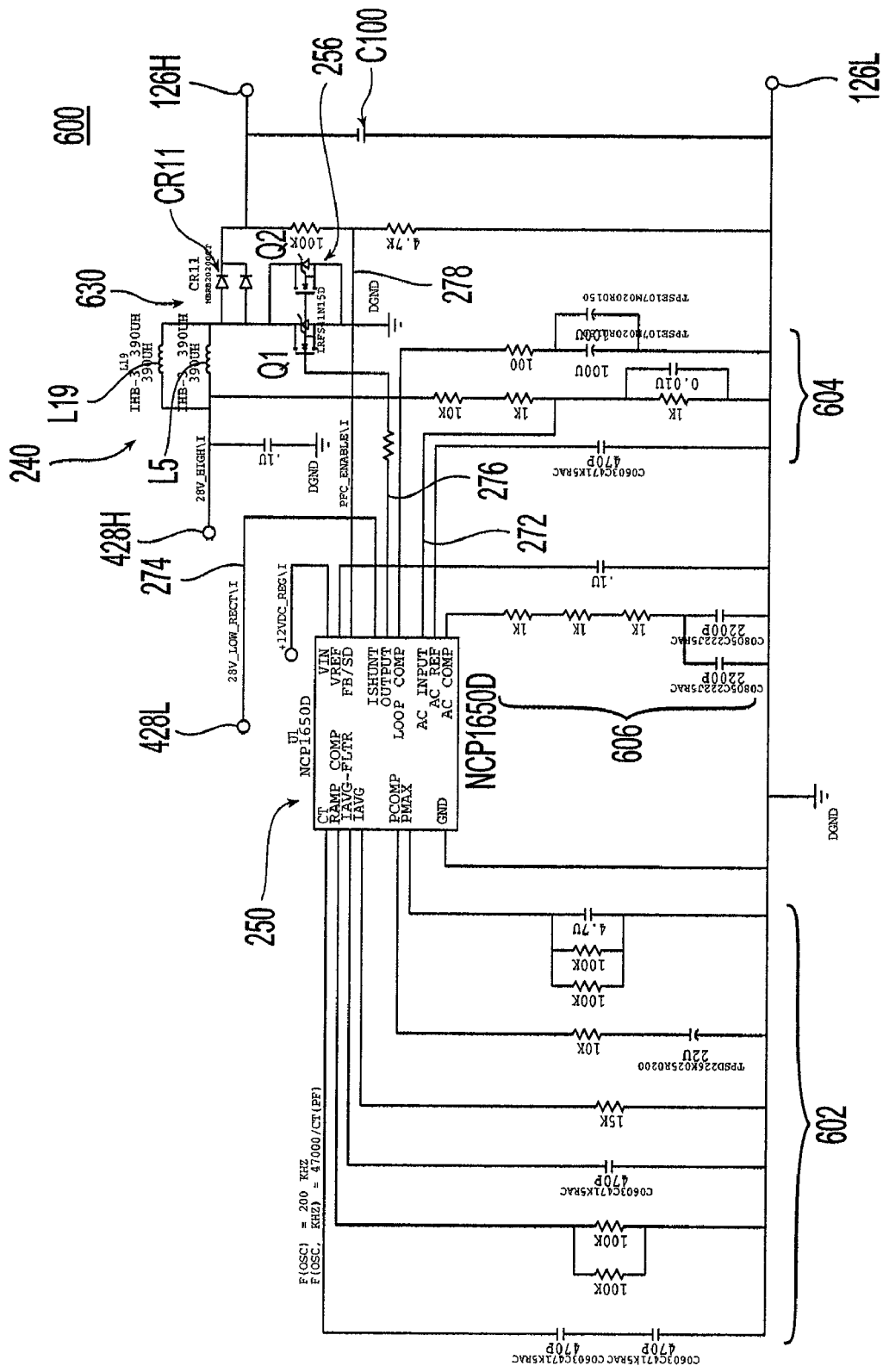
FIG. 6 shows one embodiment of circuitry implementing the power factor correction subcircuit.

FIG. 2 shows the principal functions of the PFC subcircuit 122 and FIG. 6 shows a particular implementation of this subcircuit. In one embodiment, the heart of the PFC subcircuit 122 is a PFC controller integrated circuit 250. In the embodiment shown, a power factor controller chip, part no. NCP1650 available from ON SEMICONDUCTOR® is used. It is understood, however, that other chips and circuits capable of providing the same or similar power factor correction functionality may be used instead of the PFC controller chip 250.

The output of the PFC controller chip 250 on line 276 is applied to a transistor switch 256 (represented by transistors Q1 and Q2 in FIG. 6), which belongs to boost converter 630. In one embodiment, the boost converter 630 raises the DC voltage at line 126H to 90 VDC, which is considerably higher than the nominal 28V input to the subcircuit 122. In addition to the transistor switch 256, the boost converter 630 further comprises an inductor block 240 (represented in FIG. 6 by inductors L5 & L19), a diode CR11, and a capacitor C100. The capacitor C100 allows for downstream devices to have a steady, smooth DC voltage. As in typical boost converter configurations, the transistor switch 256 connects to a node 252 between the inductor block 240 and the diode CR11.

Three main inputs are used in the control scheme of the PFC controller chip 250. First, the rectified AC signal on the high AC/DC switchover output line 428H, connected via line 244, is scaled 248, preferably via a voltage divider comprising a pair of resistors, and presented on line 272 to the AC input of the PFC controller chip 250. This allows a scaled version of the full-wave rectified AC signal input waveform to be used as a template from which the current waveform is modeled against. Second, the low AC/DC switchover output line 428L, from which the current shunt resistor 242 connects to ground (see FIG. 4), is presented on line 274 to the IS-(shunt) input of the PFC controller chip 250. In this manner, the current shunt 242 provides a feedback representation of the actual current draw of all circuits powered by the circuit 100. Finally, a scaled version of the boost converter output voltage at 126H is presented, via line 278 to the feedback input FB of the PFC controller chip 250, for output regulation. The PFC controller chip 250 uses all three of these inputs to rapidly switch the transistor 256 as part of the operation of the DC-DC boost converter 630, the power factor controlling feature, and the harmonic distortion reduction feature.

FIG. 6 shows a preferred implementation of the PFD controller chip 250. As seen in FIG. 6, in addition to the aforementioned output and three principal inputs, other pins of the chip are connected to various chip supply voltages, reference voltages, and ground, as depicted generally by circuitry 602, 604 and 606.

Figure 4:
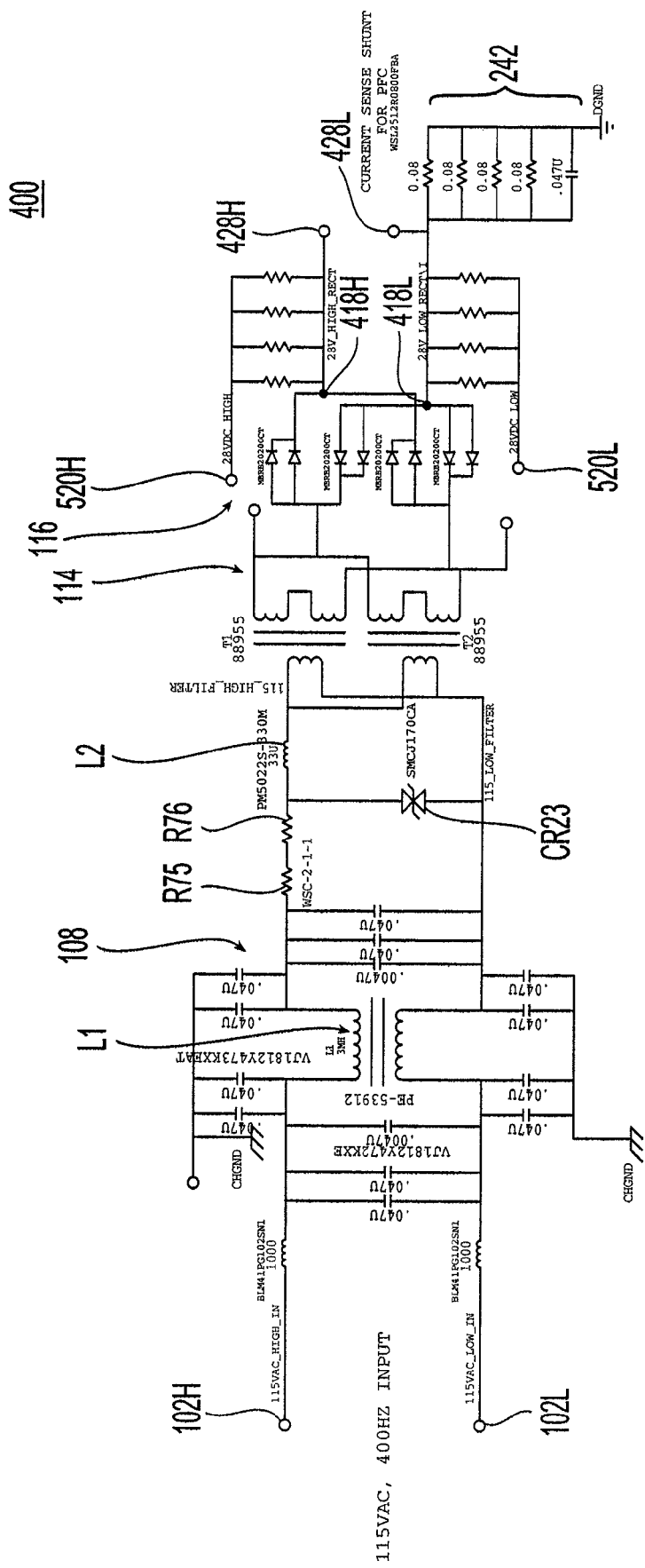
FIG. 4 shows one embodiment of circuitry implementing a 115 VAC EMI filter, and the associated transformer and rectifier.

FIG. 4 shows circuitry implementing the 115V, 400 Hz AC EMI filter 108, the step-down AC transformer 114 and the full-wave rectifier 116. As mentioned above, the EMI filter 108 is connected to the aircraft power supply via conductors 102H, 102L. It includes a common mode choke L1, a differential mode choke L2 and transient protection provided by resistors R75, R76 and transorb CR23. The step-down transformer 114 takes in the filtered 115 VAC, 400 Hz current and outputs a 28 VAC 400 Hz current. Thus, step-down AC transformer 114 has roughly a 4:1 turns ratio. The output of the step-down AC transformer 114 is input to the full wave rectifier 116. The output of the full wave rectifier comprises aforementioned lines 418H, 418L which then connect with lines 520H and 520L to form AC/DC switchover output lines 428H, 428L, which are input to the "PFC subcircuit 122. A current shunt 242 is connected to the low AC/DC switchover output line 428L, which is input to the PFC controller chip 250.

Figure 5:
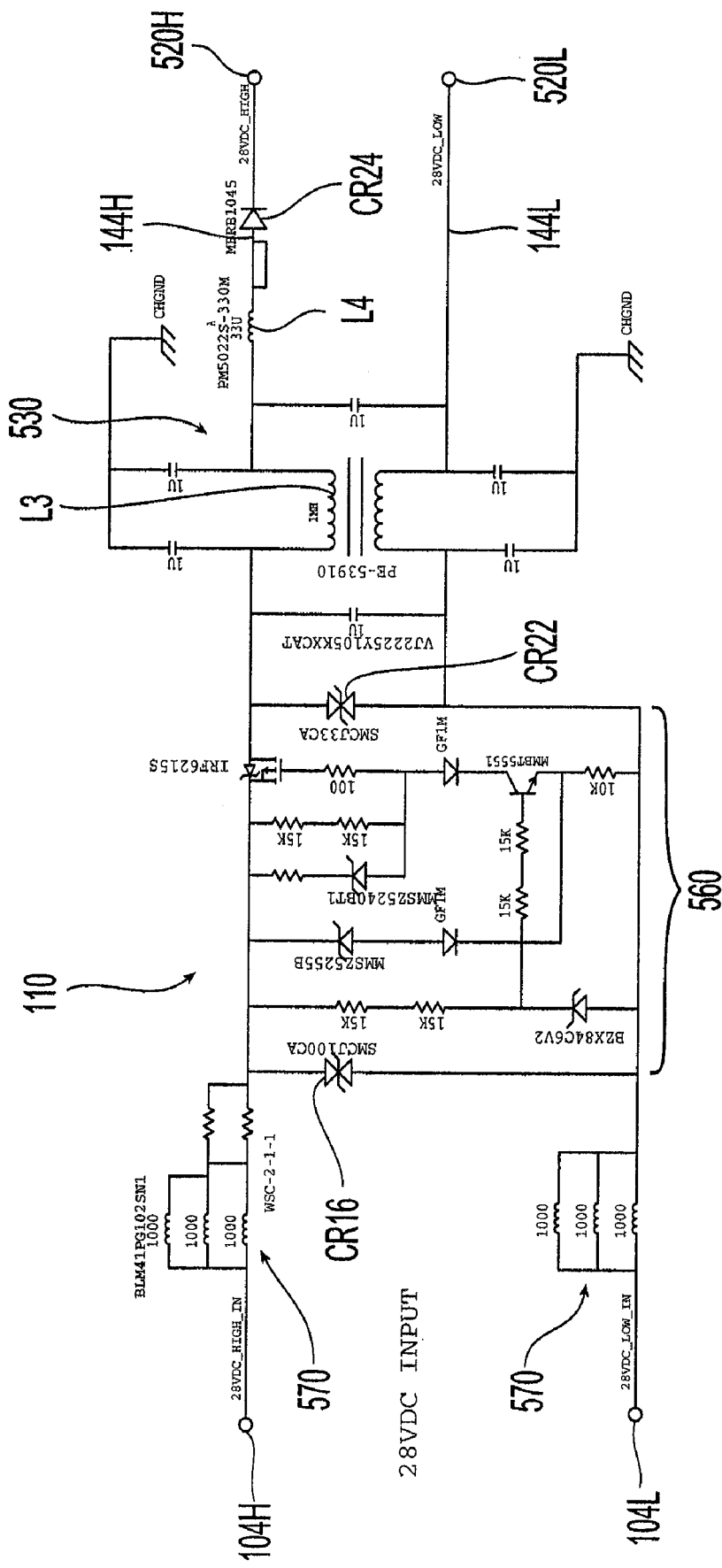
FIG. 5 shows one embodiment of circuitry implementing the 28 VDC EMI filter.

FIG. 5 shows circuitry 500 presenting an implementation of the 28 VDC EMI filter 110 and a portion of the AC/DC switchover circuit 120b seen in FIG. 2. The DC voltage supplied via aircraft power bus 104 via conductors 104H, 104L first passes through a high-frequency filter network 570 comprising one or more inductors. The signal then is submitted to a transient protection circuit 560 which includes front end transorb CR16 and back end transorb CR22, along with other components known to those skilled in the art. The DC EMI filter 110 also includes a waveshaping circuit 530 having a common mode choke L3 and a differential mode choke L4. The filtered DC signal on high DC line 144H passes through the diode CR24 of the AC/DC switchover circuit 120a (see FIG. 2) onto line 520H where it connects to high rectified AC signal line 418H, as discussed above. Meanwhile the low DC line 144H is directly connected, via line 520H, to low rectified AC signal line 418H, also as discussed above.

In the embodiment shown, the output 126H of the boost converter 630 from subcircuit 122 (see FIG. 6) is at a voltage of between 60-90 VDC. However boost converters having an even higher output maximum voltage may also be implemented, depending on the availability and performance of components used in the step-down converter 128. Regardless of the output maximum voltage, in order to make use of the power supply, this voltage must be reduced to voltages required by various components within the device in which the power supply resides.

Figure 7:
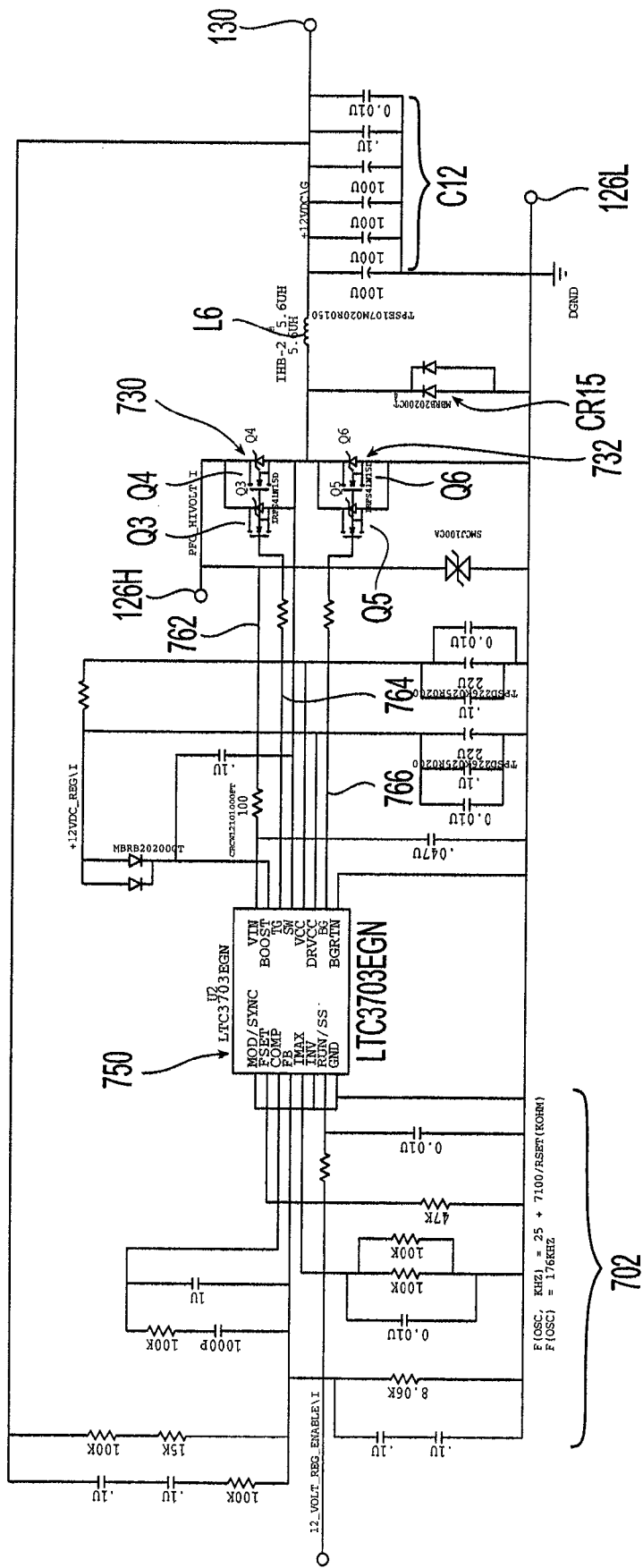
FIG. 7 shows one embodiment of circuitry implementing a step down DC power converter.

FIG. 7 shows one embodiment of the subcircuitry 700 implementing a 90V-12V DC-DC step down converter 128, commonly referred to in the art as a "buck" converter. The subcircuitry 700 includes a step-down controller 750 implemented as part no. LTC3703EGN, available from Linear Technologies. The output line 126H from the boost converter 630 is connected via line 762 to the voltage input of the step-down controller 750. The output of the step-down controller 705, on lines 764 and 766 drive switching transistors 730 (implemented as transistor pair Q3 and Q4) and 732 (implemented as transistor pair Q5 and Q6), respectively. These transistors 730, 732 work in conjunction with the buck inductor L6, diode CR15 and capacitors shown generally as C12 to reduce the voltage on line 126H to a lower output system voltage on line 130, in a known manner. Various pin settings on step-down controller 750 are controlled by circuitry, shown generally as 702.

In the embodiment shown, while the input voltage on line 126H is nominally between 60-90V, the output system voltage on line 130 from the subcircuitry 700 associated with the DC-DC step-down converter 128 is about 12 VDC. The 12 VDC output system voltage on line 130 from the step-down converter 128 can be further reduced and/or modified to produce desired DC voltages required by the various components ("component voltages") within each device having a power supply in accordance with the present invention. This may be done by the use of DC-DC converters, shown generally as 140A, 140B in FIG. 1. It is understood that each aircraft-mountable device may include several components each of which may require one or more component voltages such as +9 V, +5V, −5V, +3.3V. −3.3V and +1.8V, −1.8, among others. Implementing circuitry to perform this additional conversion is known to those skilled in the art.

Figure 8:
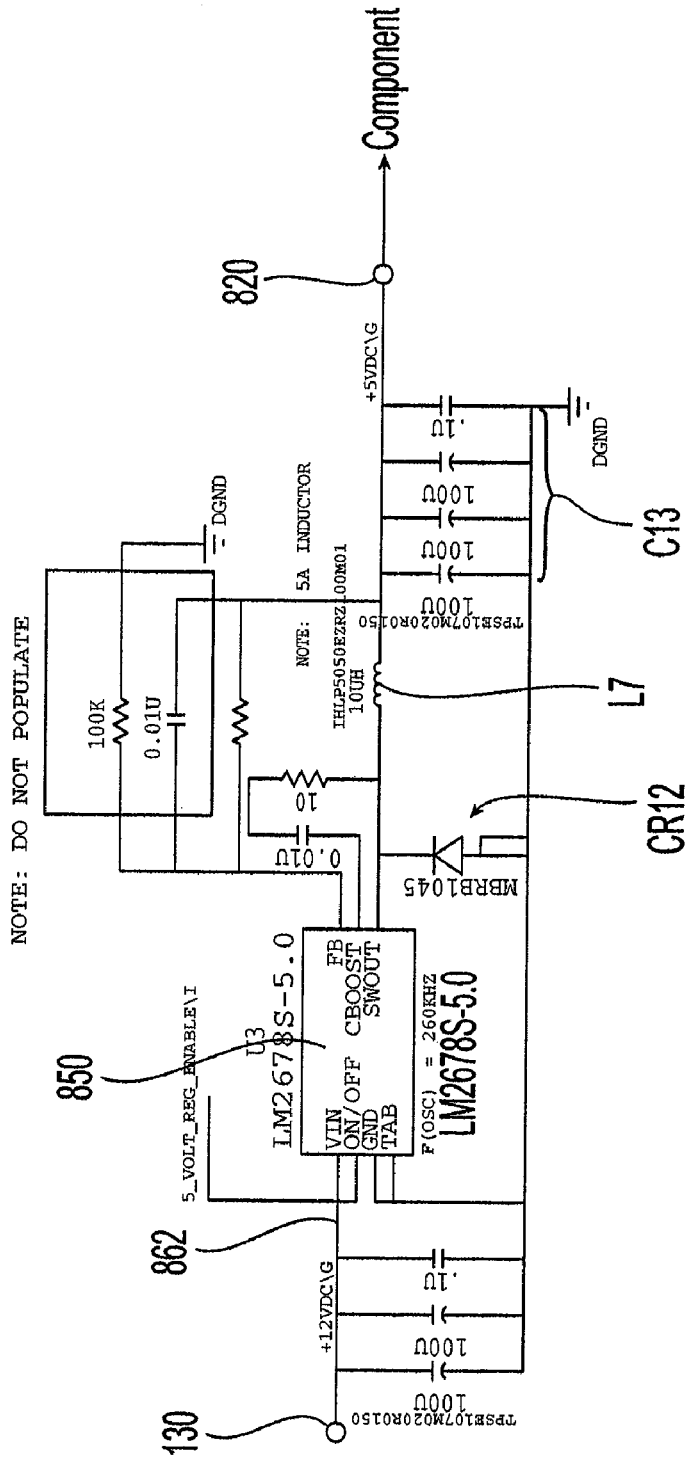
FIG. 8 shows one embodiment of circuitry implementing a converter for taking the output of the step down DC power converter to a still lower voltage.

FIG. 8 shows one embodiment of subcircuitry 800 for a DC-DC buck converter that converts the 12 VDC output on line 130 from the step down converter 128 to a +5 VDC output. In the embodiment shown, the +5 VDC converter subcircuit 800 is implemented using an LM2678S-5.0 5V step-down voltage regulator chip 850, available from National Semiconductor. The 12 VDC output on line 130 is presented to the voltage regulator chip 850 as the voltage input on line 862. The output of the voltage regulator chip 850 works in conjunction with inductor L7, diode CR13 and capacitors shown generally as C13 to produce the +5 VDC power supply. Additional subcircuits, similar to subcircuit 800, may also be provided, each such additional subcircuit having line 130 connected to their respective voltage input, with each corresponding voltage regulator chip being configured to output a different needed device voltage. In such case, the output line 130 of the step-down converter 128 in FIG. 1, may fan out into a plurality of different component voltages, as seen in FIG. 1.

Several embodiments of the present invention are specifically illustrated and/or described herein. However, it will be appreciated that modifications and variations of the present invention, especially electrical equivalents of the components in the specific implementations, are covered by the above teachings and within the purview of the appended claims without departing from the spirit and intended scope of the invention.

What is claimed is:

1. An aircraft device power supply adapted to be connected to either an aircraft alternating current (AC) power bus or to an aircraft direct current (DC) power bus, and comprising:
    a first subcircuit having an input and an output, the first subcircuit configured to accept an AC power signal, convert the AC power signal to a lower voltage, and output a rectified AC power signal, when the power supply is connected to an aircraft AC power bus;
    an AC/DC switchover subcircuit having a first input connected to the output of the first subcircuit and a second input, and further having a switchover output, the AC/DC switchover subcircuit configured to:
        detect, based on signals received at the first input and the second input, whether the power supply is connected to the aircraft AC power bus or to the aircraft DC power bus;
        output the rectified AC power signal at the switchover output, when the power supply is connected to the aircraft AC power bus and not to an aircraft DC power bus; and
        output a DC signal at the switchover output, when the power supply is connected to the aircraft DC power bus and not to the aircraft AC power bus;
    a power factor correction subcircuit having an input connected to the switchover output, and further having an output, the power factor correction subcircuit configured to correct a power factor of a rectified AC power signal, when the power supply is connected to the aircraft AC power bus, and further configured to output a DC power signal having a first voltage; and
    a DC-DC step-down converter having an input connected to the output of the power factor correction subcircuit, and further having a system voltage output, the DC-DC step-down converter configured to reduce the first voltage to a second voltage lower than said first voltage.

2. The aircraft device power supply according to claim 1, further comprising:
    an AC electromagnetic interference (EMI) filter configured to output a filtered AC power signal to the input of the first subcircuit, when the power supply is connected to the aircraft AC power bus; and
    a DC EMI filter configured to output a filtered DC power signal to the second input of the AC/DC switchover subcircuit, when the power supply is connected to the aircraft DC power bus.

3. The aircraft device power supply according to claim 2, wherein:
    the AC EMI filter is configured to filter a 115V, 400 Hz power signal from the aircraft's AC power bus; and
    the DC EMI filter is configured to filter a 28 VDC power signal from the aircraft's DC power bus.

4. The aircraft device power supply according to claim 2, wherein:
    the AC EMI filter and DC EMI filter are provided on a common integrated circuit board.

5. The aircraft device power supply according to claim 1, wherein:
    the power factor correction subcircuit comprises a power factor controller chip.

6. The aircraft device power supply according to claim 5, wherein:
    the power factor controller chip controls a boost converter to cause said first voltage to be at least 60 VDC.

7. The aircraft device power supply according to claim 6, wherein:
    the first voltage is between 60-90 VDC; and
    the second voltage is about 12 VDC.

8. The aircraft device power supply according to claim 1, wherein:
    a voltage of the rectified AC power signal is approximately the same as a voltage of the DC signal so that the power factor correction subcircuit receives approximately the same voltage, whether the power supply is connected to the aircraft's AC power bus or to the aircraft's DC power bus.

9. The aircraft device power supply according to claim 2, wherein:
    the first subcircuit is configured to convert the filtered AC power signal to a lower voltage which is approximately equal in magnitude to a voltage supplied by the aircraft's DC power bus.

10. The aircraft device power supply according to claim 1, wherein:
    the AC/DC switchover subcircuit is configured to output only one of the rectified AC power signal and the filtered DC power signal, when the power supply is connected to both the aircraft AC power bus and to the aircraft DC bus.

11. The aircraft device power supply according to claim 10, wherein:
    the AC/DC switchover subcircuit is configured to output only the rectified AC power signal, when the power supply is connected to both the aircraft AC power bus and to the aircraft DC bus.

12. An aircraft-mountable device adapted to be connected to either an aircraft alternating current (AC) power bus or to an aircraft direct current (DC) power bus, the aircraft-mountable device having a power supply comprising:
    a first subcircuit having an input and an output, the first subcircuit configured to accept an AC power signal, convert the AC power signal to a lower voltage, and output a rectified AC power signal, when the power supply is connected to an aircraft AC power bus;

an AC/DC switchover subcircuit having a first input connected to the output of the first subcircuit and a second input, and further having a switchover output, the AC/DC switchover subcircuit configured to:
  detect, based on signals received at the first input and the second input, whether the power supply is connected to the aircraft AC power bus or to the aircraft DC power bus;
  output the rectified AC power signal at the switchover output, when the power supply is connected to the aircraft AC power bus and not to an aircraft DC power bus; and
  output a DC signal at the switchover output, when the power supply is connected to the aircraft DC power bus and not to the aircraft AC power bus;

a power factor correction subcircuit having an input connected to the switchover output, and further having an output, the power factor correction subcircuit configured to correct a power factor of a rectified AC power signal, when the power supply is connected to the aircraft AC power bus, and further configured to output a DC power signal having a first voltage; and a DC-DC step-down converter having an input connected to the output of the power factor correction subcircuit, and further having a system voltage output, the DC-DC step-down converter configured to reduce the first voltage to a second voltage lower than said first voltage.

13. The aircraft-mountable device according to claim 12, wherein the device is one from the group consisting of a computer, display panel, communications equipment, a control panel, and a sensor.

14. An aircraft device power supply adapted to be connected to either an aircraft alternating current (AC) power bus or to an aircraft direct current (DC) power bus, and comprising:
  an AC electromagnetic interference (EMI) filter having a first input connectable to an aircraft AC power bus and a first output, the AC EMI filter configured to output a filtered AC power signal, when the power supply is connected to the aircraft AC power bus;
  a DC EMI filter having a second input connectable to an aircraft DC power bus and a second output, the DC EMI filter configured to output a filtered DC power signal, when the power supply is connected to the aircraft DC power bus;
  a first subcircuit having an input connected to the first output of the AC EMI filter and a third output, the first subcircuit configured to accept the filtered AC power signal, convert the filtered AC power signal to a lower voltage, and output a rectified AC power signal, when the power supply is connected to the aircraft AC power bus;
  an AC/DC switchover subcircuit having inputs connected to the second and third outputs, and further having a switchover output, the AC/DC switchover subcircuit configured to:
    detect, based on signals received from the second and third outputs, whether the power supply is connected to the aircraft AC power bus or to the aircraft DC power bus;
    output the rectified AC power signal at the switchover output, when the power supply is connected to the aircraft AC power bus and not to the aircraft DC power bus; and
    output the filtered DC power signal at the switchover output, when the power supply is connected to the aircraft DC power bus and not to the aircraft AC power bus;
  a power factor correction subcircuit having an input connected to the switchover output, and further having a fourth output, the power factor correction subcircuit configured to correct a power factor of a rectified AC power signal, when the power supply is connected to the aircraft AC power bus, and further configured to output a DC power signal having a first voltage; and
  a DC-DC step-down converter having an input connected to the fourth output, and further having a system voltage output, the DC-DC step-down converter configured to reduce the first voltage to a second voltage lower than said first voltage.

15. The aircraft device power supply according to claim 14, wherein:
  the power factor correction subcircuit comprises a power factor controller chip.

16. The aircraft device power supply according to claim 15, wherein:
  the power factor controller chip controls a boost converter to caused said first voltage to be at least 60 VDC.

17. The aircraft device power supply according to claim 16, wherein:
  the first voltage is between 60-90 VDC; and
  the second voltage is about 12 VDC.

18. The aircraft device power supply according to claim 14, wherein:
  a voltage of the rectified AC power signal is approximately the same as a voltage of the filtered DC power signal so that the power factor correction subcircuit receives approximately the same voltage, whether the power supply is connected to the aircraft's AC power bus or to the aircraft's DC power bus.

19. The aircraft device power supply according to claim 14, wherein:
  the first subcircuit is configured to convert the filtered AC power signal to a lower voltage which is approximately equal in magnitude to a voltage supplied by the aircraft's DC power bus.

20. The aircraft device power supply according to claim 14, wherein:
  the AC EMI filter is configured to filter a 115V, 400 Hz power signal from the aircraft's AC power bus; and
  the DC EMI filter is configured to filter a 28 VDC power signal from the aircraft's DC power bus.

21. The aircraft device power supply according to claim 20, wherein:
  the AC EMI filter and DC EMI filter are provided on a common integrated circuit board.

22. The aircraft device power supply according to claim 14, wherein:
  the AC/DC switchover subcircuit is configured to output only one of the rectified AC power signal and the filtered DC power signal, when the power supply is connected to both the aircraft AC power bus and to the aircraft DC bus 23. The aircraft device power supply according to claim 22, wherein:
  the AC/DC switchover subcircuit is configured to output only the rectified AC power signal, when the power supply is connected to both the aircraft AC power bus and to the aircraft DC bus.

24. The aircraft device power supply according to claim 1, further comprising:

a current shunt connected to the switchover output and to an input of the power factor correction subcircuit, the current shunt configured to provide a feedback representation of the actual current draw of the circuits powered by the aircraft device power supply.

25. The aircraft device power supply according to claim 14, further comprising:

a current shunt connected to the switchover output and to an input of the power factor correction subcircuit, the current shunt configured to provide a feedback representation of the actual current draw of the circuits powered by the aircraft device power supply.

* * * * *